United States Patent
Greenwood et al.

(10) Patent No.: US 7,881,735 B2
(45) Date of Patent: Feb. 1, 2011

(54) MESSAGING GATEWAY AND METHOD

(75) Inventors: James Greenwood, Oxfordshire (GB); Simon Dumbleton, Berkshire (GB)

(73) Assignee: Markport Limited, Dublin (IE)

( * ) Notice: Subject to any disclaimer, the term of this patent is extended or adjusted under 35 U.S.C. 154(b) by 886 days.

(21) Appl. No.: 11/791,858

(22) PCT Filed: Dec. 8, 2005

(86) PCT No.: PCT/IE2005/000141
§ 371 (c)(1),
(2), (4) Date: May 30, 2007

(87) PCT Pub. No.: WO2006/061811
PCT Pub. Date: Jun. 15, 2006

(65) Prior Publication Data
US 2008/0064424 A1    Mar. 13, 2008

Related U.S. Application Data

(60) Provisional application No. 60/634,087, filed on Dec. 8, 2004.

(51) Int. Cl.
*H04W 4/00* (2009.01)
*H04L 12/58* (2006.01)
*H04M 11/00* (2006.01)

(52) U.S. Cl. .................. 455/466; 455/412.1; 455/406; 370/349

(58) Field of Classification Search ............. 455/466, 455/412.1, 406; 370/349
See application file for complete search history.

(56) References Cited

U.S. PATENT DOCUMENTS 5,768,509 A * 6/1998 Gunluk .................. 709/203
(Continued)

FOREIGN PATENT DOCUMENTS

EP    0899918    3/1999
(Continued)

*Primary Examiner*—Ariel Balaoing
(74) *Attorney, Agent, or Firm*—Jacobson Holman PLLC

(57) ABSTRACT

An application on a server submits the message to a gateway (1) (which it sees as a service centre). The gateway performs interaction with external applications on servers such as charging and then instead of storing transaction related information associated with this message, it packages the transaction information along with the message as inter-working data. The gateway then forwards the message including the inter-working data to the service center, while requesting a delivery receipt. The service centre may generate a message-id for this transaction, but no data relating to the transaction now needs to be stored by the gateway. The gateway (1) then informs the application that it has successfully stored the message for delivery. When the message reaches a complete state in the service centre the service centre (25) sends the gateway (1) a delivery receipt including the service centre generated message-id and the inter-working data. At this point the gateway no longer needs to retrieve transaction information relating to this message (based on service centre and message-id), as the data is already present in the message. On inspection of the transaction information the gateway can determine whether the original application requested the delivery receipt, and if so, forward the receipt to the application. Dependent on the resulting state of the message and any transaction information, the gateway may interact with external servers again. At this stage the gateway (1) then generates a Call Detail Record and acknowledges receipt of the delivery receipt.

13 Claims, 2 Drawing Sheets

U.S. PATENT DOCUMENTS

| | | | |
|---|---|---|---|
| 6,067,529 A * | 5/2000 | Ray et al. | 705/26 |
| 6,473,622 B1 * | 10/2002 | Meuronen | 455/466 |
| 6,961,766 B2 | 11/2005 | Janosik, Jr. | 709/224 |
| 2002/0094811 A1 * | 7/2002 | Bright et al. | 455/433 |
| 2003/0050042 A1 * | 3/2003 | Olah | 455/406 |
| 2003/0216147 A1 * | 11/2003 | Morin et al. | 455/466 |
| 2004/0202145 A1 * | 10/2004 | Lundin | 370/349 |
| 2005/0181759 A1 * | 8/2005 | Hundscheidt et al. | 455/408 |

FOREIGN PATENT DOCUMENTS

| | | |
|---|---|---|
| WO | WO03/023978 | 3/2003 |

* cited by examiner

MESSAGING GATEWAY AND METHOD

This is a national stage of PCT/IE05/000141 filed Dec. 8, 2005 and published in English, claiming benefit of U.S. provisional application number 60/634,087, filed Dec. 8, 2004

INTRODUCTION

1. Field of the Invention

The invention relates to processing of messages by multiple systems such as elements of a mobile network.

2. Prior Art Discussion

An example of such a scenario is in a mobile network where a gateway interfaces on one "side" with SMSC and/or MMSC service centres and on the other "side" with applications. In one example the following operations take place.

1. An application submits a message to the gateway (which it sees as a service centre).
2. The gateway performs interaction with external applications such as a charging application and then stores transaction related information associated with this message in its own data store, for example data concerning whether the charge succeeded and what was the charge-transaction-id.
3. The gateway then forwards the message to the relevant service centre, while requesting a delivery receipt. The service centre may generate a message-id for this transaction which is stored along with any previously stored transaction information.
4. The gateway then informs the application that it has successfully stored the message for delivery.
5. When the message reaches a complete state in the service centre (such as delivered or expired), the service centre sends the gateway a delivery receipt including the service centre generated message-id. At this point the gateway retrieves the stored transaction information relating to this message (based on service centre and message-id). On inspection of the transaction information the gateway can determine whether the original application requested the delivery receipt, and if so, forward the receipt to the application.
6. Dependent on the resulting state of the message (for example, delivered, expired) and any transaction information, the gateway may be required to interact with external systems again, for example to undo a charge request if content was not delivered or to try again to apply a charge if the initial charge request failed for some reason.
7. At this stage the gateway then generates a Call Detail Record and acknowledges receipt of the delivery receipt.

In another example, U.S. Pat. No. 6,961,766 describes an Internet gateway which dynamically loads a database with data extracted from messages which it passes between Web browsers and Web servers.

A problem with the prior approaches, especially for busy networks with high message volumes, is that significant storage capacity and processing capacity is required for the various storage and retrieval operations. There may also be complex synchronisation problems, caused by the need to correlate information relating to the same message transaction stored in multiple systems.

The invention addresses this problem

SUMMARY OF THE INVENTION

According to the invention, there is provided a messaging method comprising the steps of:

a first system receiving or generating a message;

the first system performing processing involving the message;

the first system adding inter-working data generated by the processing to the message, and routing the message to a second system without saving the inter-working data to a database;

the second system routing the inter-working data back to the first system at a later time; and the first system processing the inter-working data received from the second system to generate a transaction output without need to perform a read from a database.

In one embodiment, the second system generates a message identifier, and routes this to the first system together with the inter-working data.

In another embodiment, the message identifier and the inter-working data are returned to the first system in a message which identifies the second system to the first system.

In a further embodiment, the first system is a gateway of a mobile network.

In one embodiment, the message is received by the first system from an application executing on a server.

In another embodiment, the first system is a gateway of a mobile network, the message is received from an application executing on a server, and the gateway emulates a service centre to the application.

In a further embodiment, the second system is a mobile network service centre.

In one embodiment, the first system is a gateway of a mobile network, and the second system is a mobile network SMSC.

In another embodiment, the second system is a mobile network MMSC.

In a further embodiment, the first system is a gateway of a mobile network, and the inter-working data concerns subscriber charging.

In one embodiment, the first system is a gateway of a mobile network, the inter-working data concerns aliasing of a telephone number, and the second system is a mobile network service centre.

In another embodiment, the gateway uses the inter-working data routed back to it by the service centre to reverse the aliasing process.

In a further embodiment, the first system is a gateway of a mobile network, the second system is a mobile network service centre, the inter-working data concerns charging, and the gateway generates a charging output upon receipt of the inter-working data from the service centre.

In another aspect, the invention provides a gateway comprising a processor for performing the steps of:

receiving or generating a message;

performing processing involving the message;

adding inter-working data generated by the processing to the message, and routing the message to a second system without saving the inter-working data to a database;

receiving the inter-working data back from the second system at a later time; and processing the inter-working data received from the second system to generate a transaction output without need to perform a read from a database.

DETAILED DESCRIPTION OF THE INVENTION

Brief Description of the Drawings

The invention will be more clearly understood from the following description of some embodiments thereof, given by way of example only with reference to the accompanying drawings in which.

DESCRIPTION OF THE EMBODIMENTS

Figure 1:
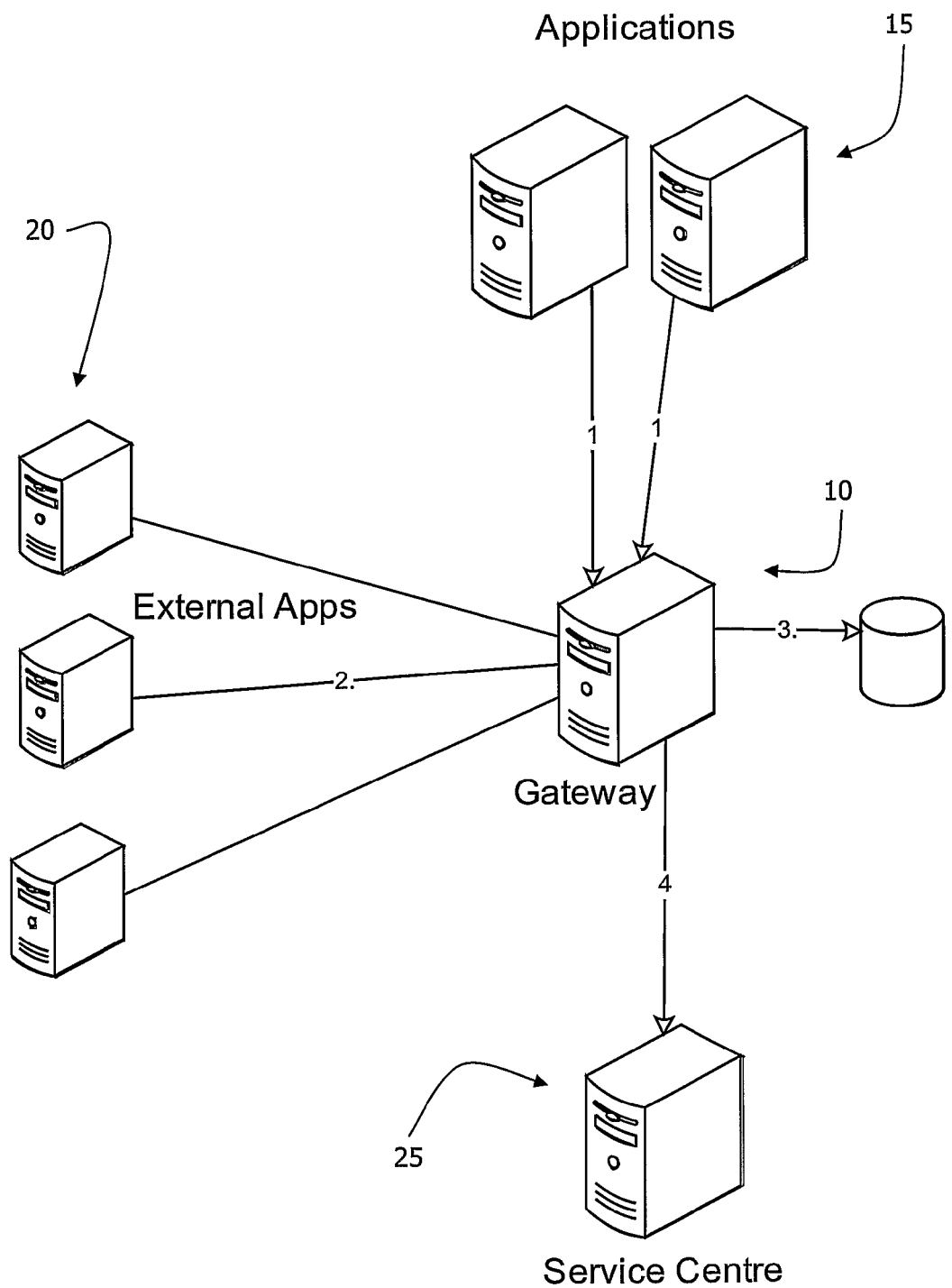
FIG. 1 is a diagram showing systems involved in a messaging method of the invention.

Referring to FIG. 1, a gateway 1 communicates with local and remote application servers 15 and 20 and with a service centre 25.

Figure 2:
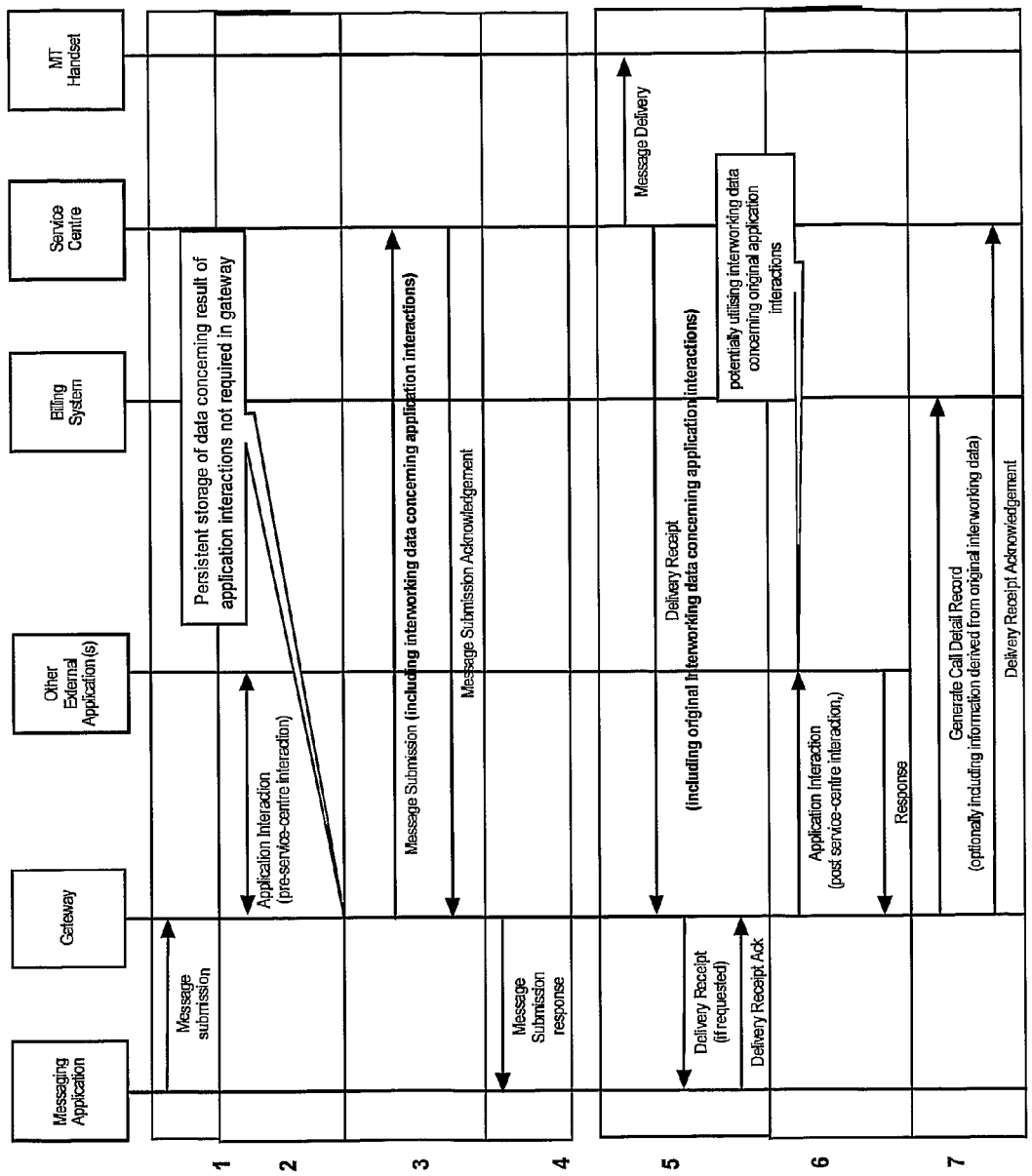
FIG. 2 is a message flow diagram illustrating the messaging method.

Referring to FIG. 2 a message flow is implemented by an application server 15 (local) or 20 (remote and external), the gateway 1, and the service centre 25. The steps are:

1. An application on a server 15 submits the message to the gateway 1 (which it sees as a service centre).
2. The gateway 1 performs interaction with external applications on servers 20 such as charging and then instead of storing transaction related information associated with this message, the gateway 1 packages the transaction information along with the message as inter-working data.
3. The gateway 1 then forwards the message including the inter-working data to the service centre 25, while requesting a delivery receipt. The service centre 25 generates a message-id for this transaction but the gateway does not now need to store the message-id, or other data relating to the gateway's processing of the message since this is encapsulated within the interworking-data passed to the service-centre.
4. The gateway 1 then informs the application that it has successfully stored the message for delivery.

When the message reaches a complete state in the service centre 25 (e.g. delivered, expired . . . ), the service centre 25 sends the gateway 1 a delivery receipt including the service centre generated message-id and the inter-working data. At this point the gateway 1 no longer needs to retrieve transaction information relating to this message (using data associated with the message such as service centre and message-id), as the data is already present in the message. The mechanism for inclusion of the inter-working-data in the delivery-receipt returned to the gateway by the service-centre is dependent on the specific protocols used. The gateway remains responsible for the format and content of the interworking-data and can therefore derive whatever information it originally included in the information which it passed to the service-centre.
5. Dependent on the resulting state of the message (delivered, expired, etc) and any transaction information, the gateway 1 may interact with external servers 20 again, for example to undo a charge request if content was not delivered or to try again to apply a charge if the initial charge request failed for some reason.

The gateway can also determine whether the original application requested a delivery-receipt and, if so, forward the delivery-receipt to the application.

6. At this stage the gateway 1 then generates a Call Detail Record and acknowledges receipt of the delivery receipt.

The inter-working data is appended by use of a specific communication protocol dedicated to the exchange of this data. Alternatively, it may be achieved using a limited extension to the existing protocols used for mobile-message inter-working between the two systems.

Mobile-messaging protocols commonly provide explicit extension mechanisms for adding new features. For example, the SMPP protocol provides for "optional-parameter" extensions to the submit_sm and deliver_sm data units allowing a new parameter to be introduced to carry the inter-working data. Protocols which have no such explicit extension mechanism can still overload existing protocol elements to carry the inter-working data.

In more general terms, the gateway performs some processing of the original message which it needs to remember, in order to perform further related processing of the message, such as at the time of final delivery. The gateway passes additional information relating to its own processing of the message to the service centre, and the service centre later passes back this same data unchanged at a later time. Thus, after message delivery or in response to an explicit query, the gateway 1 can avoid the necessity for it to implement and access a storage mechanism for its own data separate from that provided by the service-centre.

The following are two further scenarios.

To store data relating to prepaid charging.

An attempt is made to charge a message at the time it transits the messaging gateway. The gateway 1 records information relating to whether the message-originator or message-destination was a prepaid-subscriber, and whether the message-originator or message-destination were successfully charged. When this information is returned by the service-centre at the time the message is delivered (or ultimately fails to be delivered) the gateway 1 can use this information directly to take appropriate action, such as refunding subscribers on message-failure and re-attempting to charge delivered messages which were not previously charged successfully.

To store data relating to subscriber identity management.

An aliasing feature is a service provided to hide the real telephone-numbers of subscribers from the parties with which they are exchanging messages. To provide this service the gateway transforms the message-originator and message-destination attributes of a message from identities known to the submitting entity to those used in the underlying telecommunications network. The gateway 1 can apply a specific aliasing algorithm and pass information relating to the results of the aliasing process to the service-centre. When this information is returned by the service-centre at the time the message is delivered (or ultimately fails to be delivered) the gateway can use it to reverse the aliasing process. This obviates the need for local storage of data relating to the aliasing process.

The following are some benefits of the invention.

Less hardware is required.

As there is no storage requirement outside the service centre (which already contains a storage engine) the gateway does not need any extra storage. This directly impacts cost and means that lower cost.

No risk of data stores becoming out of synchronisation.
When two separate stores are tracking the same data, there is always the risk that the stores will become out of synchronisation, causing potential loss of data. This risk is removed.

Performance
The gateway can offer higher performance because it does not need to interact with an extra message store on both submission and receipt handling.

The invention is not limited to the embodiments described but may be varied in construction and detail.

The invention claimed is:

1. A mobile network messaging method comprising the steps of:
   a gateway of the mobile network receiving or generating a message;
   the gateway performing processing involving the message;
   the gateway adding inter-working data generated by the processing to the message, and routing the message to a second system without saving the inter-working data to any database outside of the second system, the second system being a mobile network service centre;
   the second system routing the inter-working data back to the gateway at a later time; and
   the gateway processing the inter-working data received from the second system to generate a transaction output without need to perform a read from a database, the gateway remaining responsible for the format and content of the interworking data and deriving whatever information it originally included in the interworking data.

2. The messaging method as claimed in claim 1, wherein the second system generates a message identifier, and routes this to the gateway together with the inter-working data.

3. The messaging method as claimed in claim 1, wherein the message identifier and the inter-working data are returned to the gateway in a message which identifies the second system to the gateway.

4. The messaging method as claimed in claim 1, wherein the message is received by the gateway from an application executing on a server.

5. The messaging method as claimed in claim 4, wherein the gateway emulates a service centre to the application.

6. The messaging method as claimed in claim 1, wherein the second system is a mobile network SMSC.

7. The messaging method as claimed in claim 1, wherein the second system is a mobile network MMSC.

8. The messaging method as claimed in claim 1, wherein the inter-working data concerns subscriber charging.

9. The messaging method as claimed in claim 1, wherein the inter-working data concerns aliasing of a telephone number.

10. The messaging method as claimed in claim 9, wherein the gateway uses the inter-working data routed back to it by the service centre to reverse the aliasing process.

11. The messaging method as claimed in claim 1, wherein the inter-working data concerns charging, and the gateway generates a charging output upon receipt of the inter-working data from the service centre.

12. A mobile network gateway comprising a processor for performing the steps of:
   receiving or generating a message;
   performing processing involving the message;
   adding inter-working data generated by the processing to the message, and routing the message to a second system without saving the inter-working data to any database outside of the second system, the second system being a mobile network service centre;
   receiving the inter-working data back from the second system at a later time; and
   processing the inter-working data received from the second system to generate a transaction output without need to perform a read from a database, the gateway remaining responsible for the format and content of the interworking data and deriving whatever information it originally included in the interworking data.

13. A non-transitory computer readable medium comprising software code for performing the steps of a method of claim 1.

* * * * *